United States Patent
Maiman et al.

(10) Patent No.: US 11,842,241 B1
(45) Date of Patent: Dec. 12, 2023

(54) CONTRACTABLE TRANSACTION CARD

(71) Applicant: Capital One Services, LLC, McLean, VA (US)

(72) Inventors: Tyler Maiman, Melville, NY (US); Shannon Yogerst, New York, NY (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/049,421

(22) Filed: Oct. 25, 2022

(51) Int. Cl.
*G06K 19/077* (2006.01)

(52) U.S. Cl.
CPC .............................. *G06K 19/0772* (2013.01)

(58) Field of Classification Search
CPC .... G06K 19/0772; G06K 19/00; G06K 19/07; G06K 19/067; G06K 19/04; G06Q 20/34; G06Q 20/341
USPC ................................. 235/492, 380, 375, 487
See application file for complete search history.

(56) References Cited

U.S. PATENT DOCUMENTS

2005/0229450 A1* 10/2005 Larsen ...................... G09F 3/10
40/310

* cited by examiner

*Primary Examiner* — Edwyn Labaze
(74) *Attorney, Agent, or Firm* — Harrity & Harrity, LLP

(57) ABSTRACT

In some implementations, a transaction card includes a first card body portion, a second card body portion, at least one of an integrated circuit chip or a magnetic stripe accessible from at least one of the first card body portion or the second card body portion, and a third card body portion that includes a series of accordion pleats. The series of accordion pleats may be between the first card body portion and the second card body portion. The series of accordion pleats may be configured to contract the third card body portion into a contracted configuration, and to expand the third card body portion into an expanded configuration. The first card body portion may be nearer to the second card body portion with the third card body portion in the contracted configuration than with the third card body portion in the expanded configuration.

20 Claims, 4 Drawing Sheets

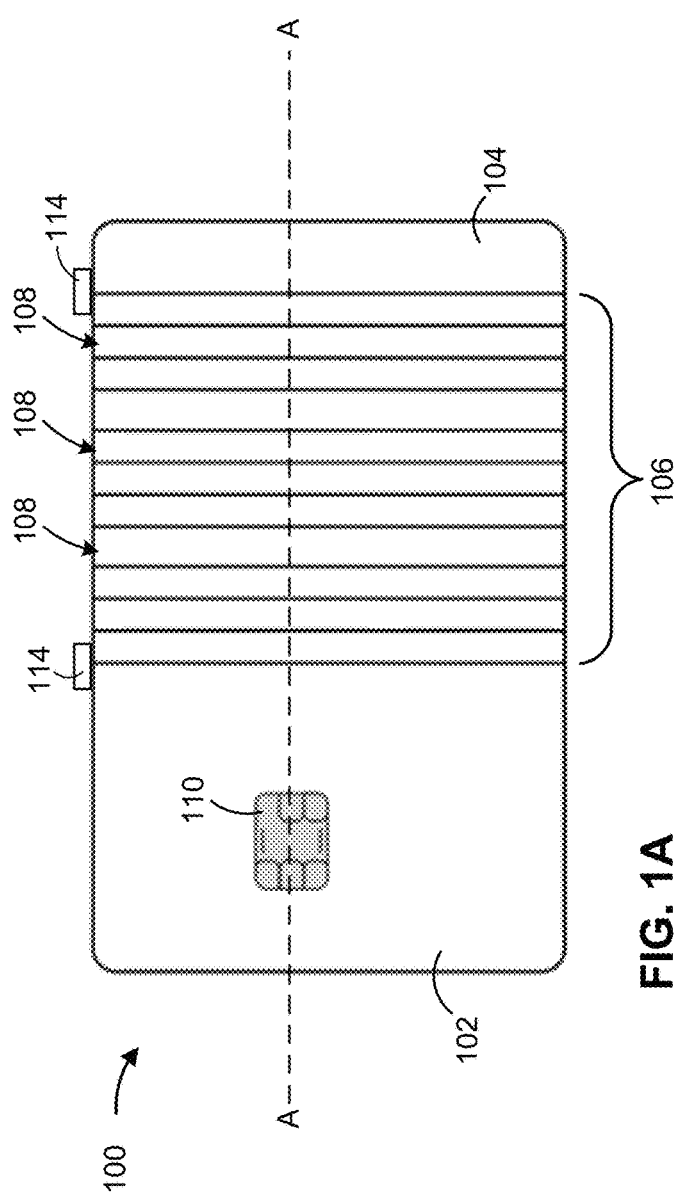
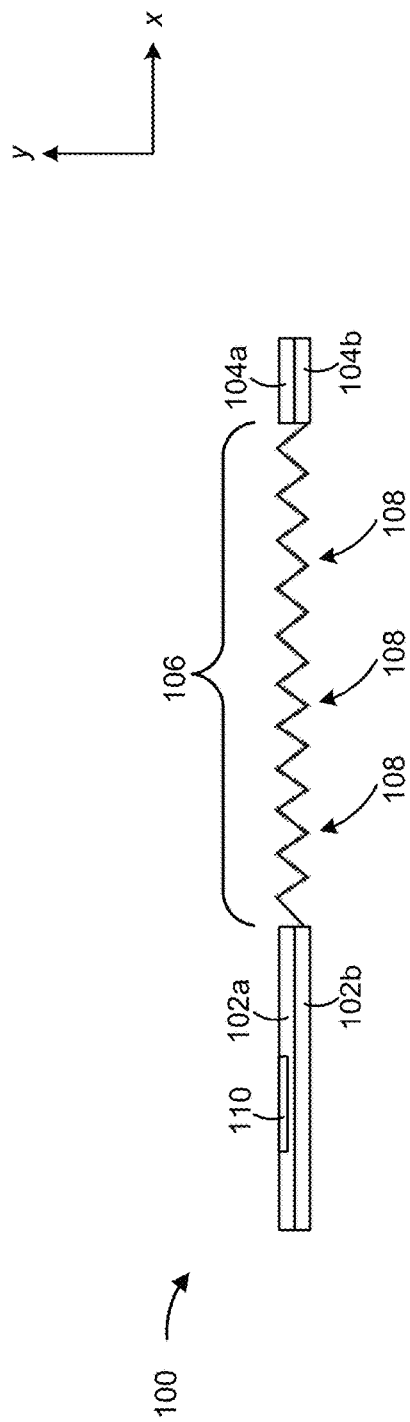
FIG. 1A
FIG. 1B

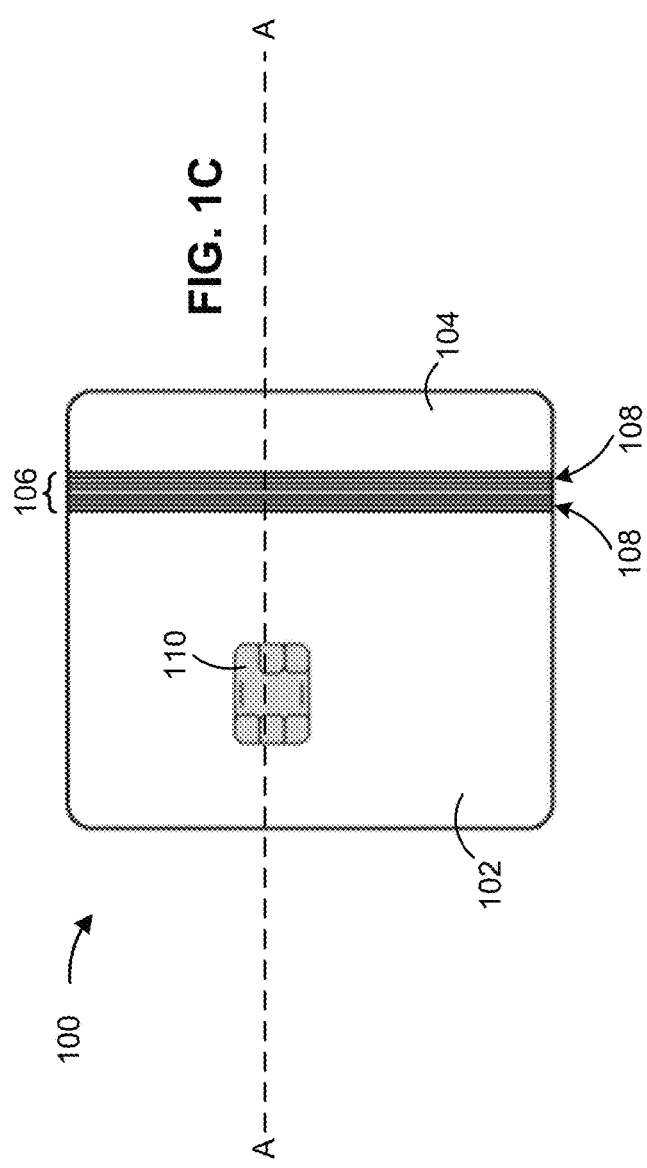
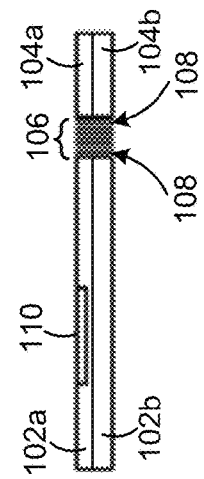
FIG. 1C
FIG. 1D

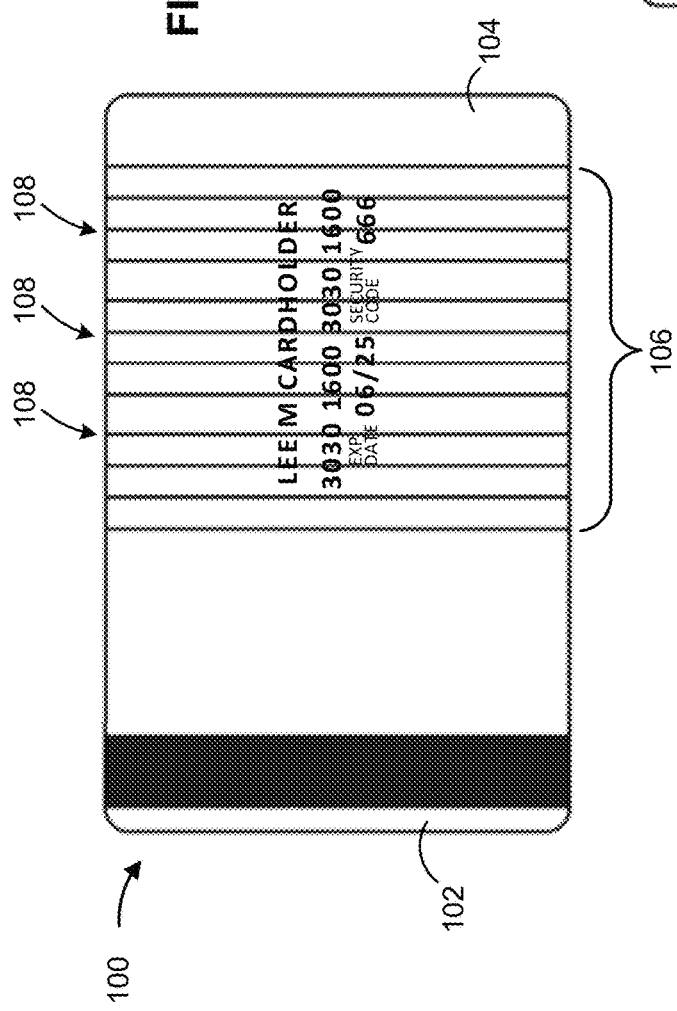
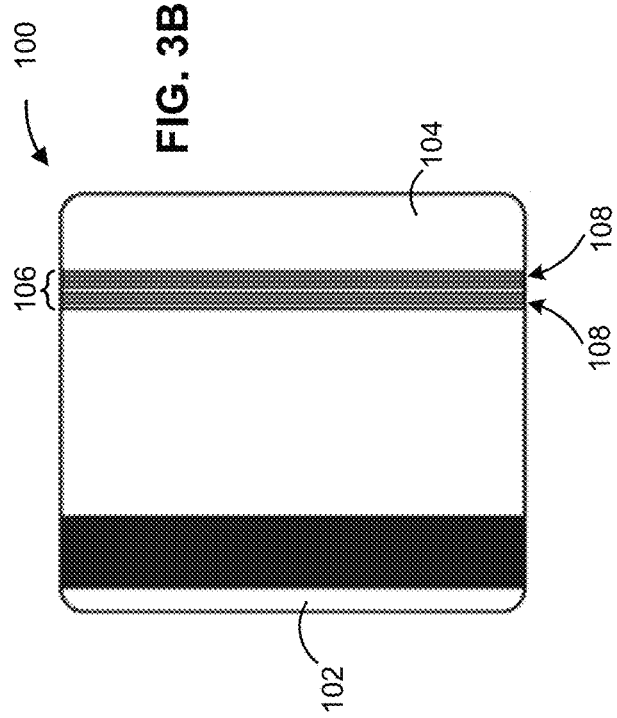

US 11,842,241 B1

CONTRACTABLE TRANSACTION CARD

BACKGROUND

Transactions often involve use of a transaction card (e.g., a credit card, a debit card, a gift card, an automated teller machine (ATM) card, a rewards card, an access card, or client loyalty card, among other examples) to pay for products or services at a transaction terminal (e.g., point of sale (PoS) terminal) of an individual or business engaged in the sale of goods or services (e.g., via a swiping of the transaction card at a card reader, insertion of the transaction card into a chip reader, or wireless transmission of transaction card data to a wireless receiver). In some instances, a magnetic stripe, integrated circuit chip, radio frequency (RF) antenna, and/or radio frequency identification (RFID) tag may be included in a transaction card to provide information associated with the transaction card (e.g., an account identifier, account information, a payment token, or the like).

SUMMARY

In some implementations, a transaction card includes a first card body portion, a second card body portion, at least one of an integrated circuit (IC) chip or a magnetic stripe accessible from at least one of the first card body portion or the second card body portion, and a third card body portion that includes a series of accordion pleats. The series of accordion pleats may be between the first card body portion and the second card body portion. The series of accordion pleats may be configured to contract the third card body portion into a contracted configuration, and to expand the third card body portion into an expanded configuration. The first card body portion may be nearer to the second card body portion with the third card body portion in the contracted configuration than with the third card body portion in the expanded configuration.

In some implementations, a transaction card includes a first card body portion, a second card body portion, and a third card body portion that includes a series of pleats. The series of pleats may be between the first card body portion and the second card body portion. The series of pleats may be configured to contract the third card body portion into a contracted configuration, and to expand the third card body portion into an expanded configuration. A length of the transaction card may be decreased with the third card body portion in the contracted configuration relative to with the third card body portion in the expanded configuration.

In some implementations, a transaction card includes a first card body portion, a second card body portion, at least one of an IC chip or a magnetic stripe accessible from at least one of the first card body portion or the second card body portion, and a third card body portion configured to contract into a contracted configuration, and to expand into an expanded configuration.

BRIEF DESCRIPTION OF THE DRAWINGS

FIG. 1A is a front view of an example transaction card in an expanded configuration, in accordance with some embodiments of the present disclosure.

FIG. 1B is a cross-sectional view of the transaction card in the expanded configuration taken along line A-A, in accordance with some embodiments of the present disclosure.

FIG. 1C is a front view of the transaction card in a contracted configuration, in accordance with some embodiments of the present disclosure.

FIG. 1D is a cross-sectional view of the transaction card in the contracted configuration taken along line A-A.

FIG. 3A is an example back view of the transaction card in an expanded configuration, in accordance with some embodiments of the present disclosure.

FIG. 3B is an example back view of the transaction card in a contracted configuration, in accordance with some embodiments of the present disclosure.

DETAILED DESCRIPTION

Figure 2:
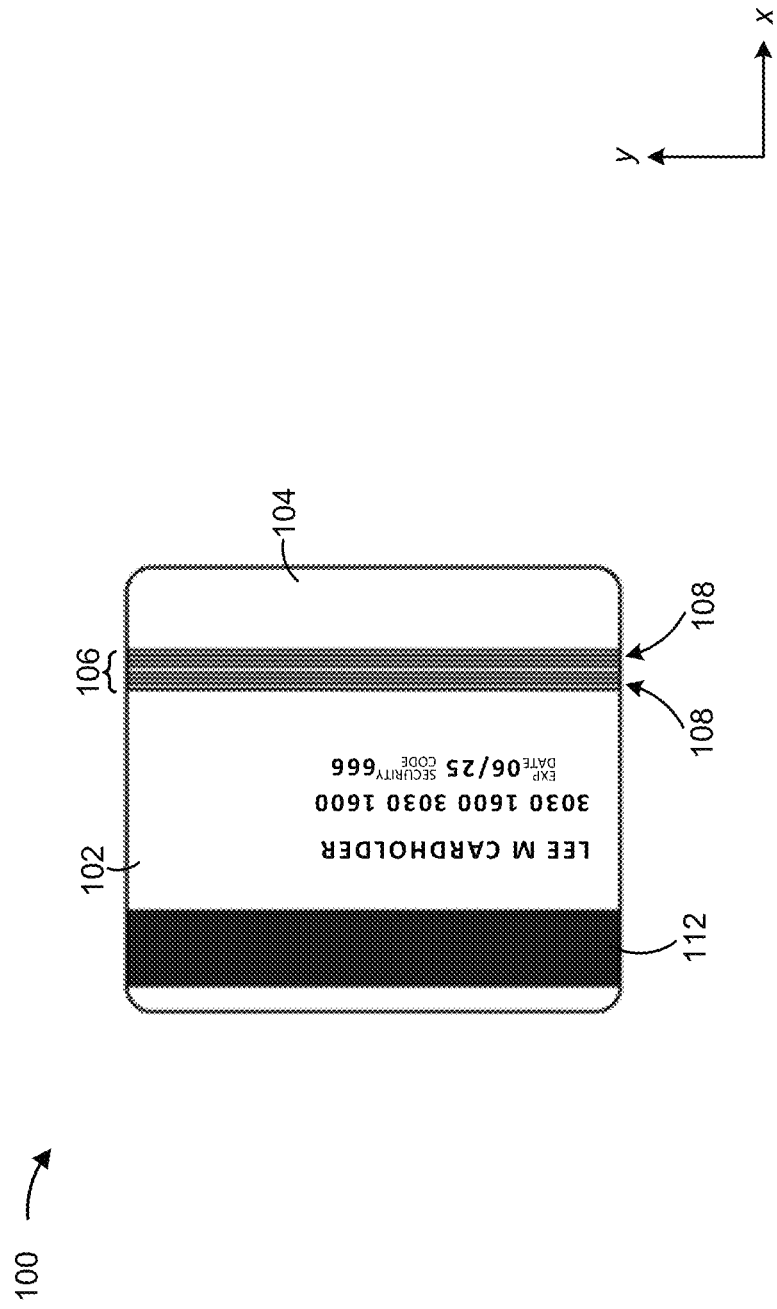
FIG. 2 is an example back view of the transaction card, in accordance with some embodiments of the present disclosure.

The following detailed description of example implementations refers to the accompanying drawings. The same reference numbers in different drawings may identify the same or similar elements.

An individual may carry a storage article, such as a wallet, a billfold, a purse, or the like, to store one or more transaction cards. In some cases, numerous transaction cards may be stored in the storage article, which may be an inefficient use of limited space in the storage article (e.g., because it is useful to store other items in the storage article, such as currency, identification cards, or the like) and/or may result in excessive bulkiness of the storage article. In addition, a transaction card may be a target of fraudulent behavior. For example, the information needed to make charges to an account associated with the transaction card (e.g., account number, expiration date, security code, or the like) may be printed on the transaction card. Thus, a malicious actor may be able to obtain such information, and perform fraudulent charges to the account, merely by viewing the transaction card. An entity (e.g., an issuer of the transaction card) may expend significant computing resources (e.g., processor resources and/or memory resources) toward identifying fraudulent charges, investigating fraudulent charges, blocking fraudulent charges, correcting fraudulent charges, or the like.

Some implementations described herein provide a transaction card configured to expand and contract along a length of the transaction card. In some implementations, the transaction card may include a series of pleats (e.g., accordion pleats), in a card body of the transaction card, that enable expansion and contraction of the transaction card. In some implementations, textual information (e.g., indicating account information associated with the transaction card) may be on the series of pleats, such that the textual information is exposed when the transaction card is expanded and concealed when the transaction card is contracted.

When the transaction card is contracted, an area (e.g., in a storage article) that is occupied by the transaction card may be reduced by 30% to 50%. In this way, the transaction card may facilitate a more efficient use of the space of a storage article and/or may reduce a bulkiness of the storage article. In addition, by concealing the textual information when the transaction card is contracted, the transaction card may reduce fraud, thereby conserving computing resources that may have otherwise been used toward identifying fraudulent charges, investigating fraudulent charges, blocking fraudulent charges, correcting fraudulent charges, or the like.

FIG. 1A is a front view of an example transaction card 100 in an expanded configuration, FIG. 1B is a cross-sectional view of the transaction card 100 in the expanded configuration taken along line A-A, FIG. 1C is a front view of the transaction card 100 in a contracted configuration, and FIG. 1D is a cross-sectional view of the transaction card 100 in the contracted configuration taken along line A-A. The transaction card 100 may include a credit card, a debit card, a gift card, an ATM card, a rewards card, an access card, or a client loyalty card, among other examples.

The transaction card 100 may include a card body composed of a first card body portion 102, a second card body portion 104, and a third card body portion 106. The transaction card 100 may have a length (e.g., along the x-axis shown) and a height (e.g., along the y-axis shown). In some implementations, the transaction card 100 may have a generally rectangular shape; however, other shapes are possible. For example, the length of the transaction card 100 may be about (e.g., ±5%) 85 millimeters (mm) (e.g., 85.6 mm) and the height of the transaction card 100 may be about 54 mm (e.g., 53.98 mm). The first card body portion 102 and the second card body portion 104 of the transaction card 100 may have a thickness of about 0.75 mm (e.g., 0.76 mm).

The card body of the transaction card 100 may include (e.g., may be composed of) a resilient material (e.g., a material that returns to an equilibrium position following deformation). For example, the card body may include a plastic (e.g., polyvinyl chloride (PVC)) and/or a metal (e.g., steel). In some examples, the card body may include multiple layers, as shown in FIGS. 1B and 1D and described below, and the multiple layers may be different materials from each other. In some implementations, the third card body portion 106 may include a thermoplastic material (e.g., a thermoplastic material that has a sufficiently high hardness to be malleable, but that is not brittle, to avoid cracking during use), such as polypropylene. The third card body portion 106 may include a material that is different from at least one material of the first card body portion 102 and/or the second card body portion 104.

The first card body portion 102 may have a generally rectangular shape. For example, a height (e.g., along the y-axis shown) of the first card body portion 102 may be greater than a length (e.g., along the x-axis shown) of the first card body portion 102. Similarly, the second card body portion 104 may have a generally rectangular shape. For example, a height (e.g., along the y-axis shown) of the second card body portion 104 may be greater than a length (e.g., along the x-axis shown) of the second card body portion 104. In some implementations, an area of the first card body portion 102 (e.g., length×height of the first card body portion 102) may be equivalent to (e.g., the same as) an area of the second card body portion 104 (e.g., length× height of the second card body portion 104). In some implementations, the area of the first card body portion 102 may be greater (e.g., at least 4 times greater) than the area of the second card body portion 104, as shown. For example, the length of the first card body portion 102 may be greater (e.g., at least 4 times greater) than the length of the second card body portion 104, and the height of the first card body portion 102 may be the same as the height of the second card body portion 104.

The third card body portion 106 may be configured to expand into an expanded configuration, as shown in FIGS. 1A-1B, and to contract into a contracted configuration, as shown in FIGS. 1C-1D. For example, a contraction of the contracted configuration and an expansion of the expanded configuration may be along the length (e.g., along the x-axis shown) of the transaction card 100. To enable the contraction and the expansion, the third card body portion 106 may include a series of pleats 108 (e.g., one or more pleats 108) or another element capable of expansion and contraction, such as telescoping members. The series of pleats 108 may be a series of accordion pleats or another type of pleats. A pleat 108 may include (e.g., in the contracted configuration) two angled portions, of the third card body portion 106, that meet at an apex. In some implementations, the peak may include a living hinge or a hinge element (e.g., a pin that joins ends of the two angled portions). The series of pleats 108 may be between the first card body portion 102 and the second card body portion 104. In some implementations, the third card body portion 106 may be integral with the first card body portion 102 and the second card body portion 104 (e.g., the series of pleats 108 may be formed in a single piece of material that includes the first card body portion 102 and the second card body portion 104).

The series of pleats 108 may be configured to contract the third card body portion 106 into the contracted configuration and to expand the third card body portion into the expanded configuration. In the contracted configuration (as shown in FIGS. 1C-1D), the length (e.g., along the x-axis shown) of the third card body portion 106, and of the transaction card 100, may be decreased (e.g., the length of the transaction card may be decreased with the third card body portion in the contracted configuration relative to with the third card body portion in the expanded configuration). That is, in the contracted configuration, the first card body portion 102 and the second card body portion 104 may be nearer to each other (e.g., the first card body portion may be nearer to the second card body portion with the third card body portion in the contracted configuration than with the third card body portion in the expanded configuration). In the expanded configuration (as shown in FIGS. 1A-1B), the length of the third card body portion 106, and of the transaction card, 100 may be increased (e.g., the length of the third card body portion 106, and of the transaction card 100, is greater in the expanded configuration than in the contracted configuration). That is, in the expanded configuration, the first card body portion 102 and the second card body portion 104 may be farther from each other. In some implementations, the series of pleats 108 may be configured to contract the third card body portion 106 into at least one intermediate contracted configuration between the expanded configuration and the contracted configuration. In other words, the series of pleats 108 may enable expansion and contractions of the third card body portion 106 along the length (e.g., along the x-axis shown) of the transaction card 100.

In some implementations, the transaction card 100 may include a set of retaining elements 114 configured to maintain the third card body portion 106 in the contracted configuration. For example, the set of retaining elements 114 may include a first retaining element 114 connected to the first card body portion 102 and a second retaining element 114 connected to the second card body portion 104. The first retaining element 114 and the second retaining element 114 may be configured to mate, connect, latch, or otherwise fasten to each other. For example, the set of retaining elements 114 may include magnets, hook and loop fasteners, a latch coupling, or the like.

As shown in FIGS. 1B and 1D, the first card body portion 102 may include multiple first layers 102a, 102b, and the second card body portion 104 may include multiple second layers 104a, 104b. Although FIGS. 1B and 1D show the multiple first layers as two layers and the multiple second layers as two layers, the multiple first layers may include three or more layers and/or the multiple second layers may include three or more layers. The series of pleats 108 may be connected to a layer (shown as layer 102b, however the connection may be to layer 102*a*) of the multiple first layers and to a layer (shown as layer 104*b*, however the connection may be to layer 104*a*) of the multiple second layers. For example, the series of pleats 108 may be between the layer 102*b* of the multiple first layers and the layer 104*b* of the multiple second layers. In some implementations, the series of pleats 108 may be between the layer 102*a* and the layer 104*a*, between the layer 102*a* and the layer 104*b*, or between the layer 102*b* and the layer 104*a*.

In some implementations, a first end of the series of pleats 108 may be connected to (e.g., by adhesive) a proximal end of the layer 102*b* of the multiple first layers and a second end of the series of pleats 108 may be connected to (e.g., by adhesive) a proximal end of the layer 104*b* of the multiple second layers. In some implementations, the third card body portion 106 may include a first planar portion (not shown) and a second planar portion (not shown) that extend from either end of the series of pleats 108, and the first planar portion may be disposed on the layer 102*b* of the multiple first layers and the second planar portion may be disposed on the layer 104*b* of the multiple second layers. In some implementations, the series of pleats 108 may be integral with the layer 102*b* of the multiple first layers and the layer 104*b* of the multiple second layers (e.g., the series of pleats 108 may be formed in a single piece of material that includes the layer 102*b* and the layer 104*b*).

In some implementations, the layer 102*b* of the multiple first layers and the layer 104*b* of the multiple second layers, to which the series of pleats 108 is connected, may be outer layers of the transaction card 100, as shown. In some implementations, the layer 102*b* of the multiple first layers and the layer 104*b* of the multiple second layers, to which the series of pleats 108 is connected, may be core layers of the transaction card 100. For example, the first card body portion 102 may include an additional layer (not shown), and the layer 102*b* may be between the layer 102*a* and the additional layer. Continuing with the example, the second card body portion 104 may include an additional layer (not shown), and the layer 104*b* may be between the layer 104*a* and the additional layer.

The transaction card 100 may include an IC chip 110 (e.g., a EUROPAY®, MASTERCARD®, VISA® (EMV) chip). Additionally, or alternatively, the transaction card 100 may include a magnetic stripe 112 (shown in FIG. 2). The IC chip 110 may be embedded in the transaction card 100 and accessible from the first card body portion 102 or the second card body portion 104. For example, electrical contacts of the IC chip 110 may be electrically accessible (e.g., by a chip reader) from a surface of the first card body portion 102 or the second card body portion 104. The magnetic stripe 112 (also referred to as a "magnetic strip") may be disposed on the transaction card 100 and accessible from the first card body portion 102 or the second card body portion 104. For example, the magnetic stripe 112 may be readable (e.g., by a magnetic stripe reader) from a surface of the first card body portion 102 or the second card body portion 104. The IC chip 110 and the magnetic stripe 112 may store and/or encode information associated with the transaction card 100. For example, the information may identify an account associated with the transaction card 100.

In some implementations, a method of manufacturing the transaction card 100 may include a step of forming (e.g., by a machine) a series of pleats 108 in the third card body portion 106 of the transaction card 100. The series of pleats 108 may be formed by injection molding, etching, pressing (e.g., by heating the third card body portion 106 and pressing the heated third card body portion 106 with a mold or die), or the like. In some implementations, the method may include joining (e.g., by the machine) the third card body portion 106 between the first card body portion 102 and the second card body portion 104. The third card body portion 106 may be joined to the first card body portion 102 and the second card body portion 104 by an adhesive. Additionally, or alternatively, joining the third card body portion 106 to the first card body portion 102 and the second card body portion 104 may include laminating (e.g., using a lamination process) respective planar portions, of the third card body portion 106 extending from the series of pleats 108, on the first card body portion 102 and the second card body portion 104. In some implementations, the method may include applying textual information to the third card body portion 106. The textual information may be applied to a portion of the series of pleats 108 (e.g., after forming the series of pleats 108), or to an area of the third card body portion 106 that is to be formed into the series of pleats 108 (e.g., before forming the series the pleats 108). The textual information may be applied by printing, stamping, embossing, or the like.

As indicated above, FIGS. 1A-1D are provided as examples. Other examples may differ from what is described with regard to FIGS. 1A-1D.

FIG. 2 is an example back view of the transaction card 100. As shown, the transaction card 100 may include the magnetic stripe 112 on the first card body portion 102. In some implementations, the magnetic stripe 112 may extend along the height (e.g., along the y-axis shown) of the first card body portion 102 (e.g., from a first edge to a second edge of the first card body portion 102). This arrangement of the magnetic stripe 112, which is different from a conventional, lengthwise arrangement of a magnetic stripe, facilitates swiping of the magnetic stripe 112 at a magnetic stripe reader free of interference from the series of pleats 108. In some implementations, textual information (e.g., indicating account information associated with the transaction card 100) may be on the first card body portion 102.

The transaction card 100 may include both the IC chip 110 and the magnetic stripe 112. In some implementations, both of the IC chip 110 and the magnetic stripe 112 may be accessible from the first card body portion 102 (e.g., the IC chip 110 may be embedded in the first card body portion 102 and the magnetic stripe 112 may be disposed on the first card body portion 102). In some implementations, one of the IC chip 110 or the magnetic stripe 112 may be accessible from the first card body portion 102, and the other of the IC chip 110 or the magnetic stripe 112 may be accessible from the second card body portion 104.

As indicated above, FIG. 2 is provided as an example. Other examples may differ from what is described with regard to FIG. 2.

FIG. 3A is an example back view of the transaction card 100 in an expanded configuration, and FIG. 3B is an example back view of the transaction card 100 in a contracted configuration. As shown in FIG. 3A, the third card body portion 106 may include textual information (e.g., indicating account information associated with the transaction card 100) on at least a portion of the series of pleats 108. Accordingly, the textual information may be exposed (e.g., visible and/or legible) in the expanded configuration of the third card body portion 106, as shown in FIG. 3A, and may be concealed (e.g., not visible and/or illegible) in the contracted configuration of the third card body portion 106. The transaction card 100 may be used (e.g., the IC chip 110 and/or the magnetic stripe 112 of the transaction card 100 may be used) while the textual information is concealed. In this way, the transaction card 100 may provide improved security by concealing the textual information and reducing a likelihood that account information associated with the transaction card 100 will be fraudulently obtained.

As indicated above, FIGS. 3A-3B are provided as an example. Other examples may differ from what is described with regard to FIGS. 3A-3B.

The foregoing disclosure provides illustration and description, but is not intended to be exhaustive or to limit the implementations to the precise forms disclosed. Modifications may be made in light of the above disclosure or may be acquired from practice of the implementations.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transaction card, comprising:
    a first card body portion;
    a second card body portion;
    at least one of an integrated circuit (IC) chip or a magnetic stripe accessible from at least one of the first card body portion or the second card body portion; and
    a third card body portion that comprises a series of accordion pleats,
        wherein the series of accordion pleats are between the first card body portion and the second card body portion, and
        wherein the series of accordion pleats are configured to contract the third card body portion into a contracted configuration, and to expand the third card body portion into an expanded configuration,
        wherein the first card body portion is nearer to the second card body portion with the third card body portion in the contracted configuration than with the third card body portion in the expanded configuration.

2. The transaction card of claim 1, wherein the third card body portion is integral with the first card body portion and the second card body portion.

3. The transaction card of claim 1, wherein the first card body portion comprises multiple first layers and the second card body portion comprises multiple second layers, and
    wherein the series of accordion pleats are connected to a layer of the multiple first layers and a layer of the multiple second layers.

4. The transaction card of claim 3, wherein the series of accordion pleats is integral with the layer of the multiple first layers and the layer of the multiple second layers.

5. The transaction card of claim 1, wherein the transaction card comprises the IC chip and the magnetic stripe, and
    wherein one of the IC chip or the magnetic stripe is accessible from the first card body portion, and the other of the IC chip or the magnetic stripe is accessible from the second card body portion.

6. The transaction card of claim 1, wherein the third card body portion includes textual information on at least a portion of the series of accordion pleats, and
    wherein the textual information is concealed in the contracted configuration of the third card body portion and is exposed in the expanded configuration of the third card body portion.

7. The transaction card of claim 1, wherein a height of the first card body portion is greater than a length of the first card body portion, and
    wherein the magnetic stripe extends along the height of the first card body portion from a first edge of the first card body portion to a second edge of the first card body portion.

8. A transaction card, comprising:
    a first card body portion;
    a second card body portion; and
    a third card body portion that comprises a series of pleats,
        wherein the series of pleats are between the first card body portion and the second card body portion, and
        wherein the series of pleats are configured to contract the third card body portion into a contracted configuration, and to expand the third card body portion into an expanded configuration,
        wherein a length of the transaction card is decreased with the third card body portion in the contracted configuration relative to with the third card body portion in the expanded configuration.

9. The transaction card of claim 8, further comprising:
    at least one of an integrated circuit chip or a magnetic stripe accessible from at least one of the first card body portion or the second card body portion.

10. The transaction card of claim 9, wherein a height of the first card body portion is greater than a length of the first card body portion, and
    wherein the magnetic stripe extends along the height of the first card body portion.

11. The transaction card of claim 8, wherein the series of pleats are configured to contract the third card body portion into at least one intermediate contracted configuration between the expanded configuration and the contracted configuration.

12. The transaction card of claim 8, wherein the third card body portion includes textual information on at least a portion of the series of pleats, and
wherein the textual information is concealed in the contracted configuration of the third card body portion and is exposed in the expanded configuration of the third card body portion.

13. The transaction card of claim 8, wherein a height of the transaction card is greater than the length of the transaction card, and
wherein a contraction of the contracted configuration of the third card body portion and an expansion of the expanded configuration of the third card body are along the length of the transaction card.

14. The transaction card of claim 8, wherein the first card body portion comprises multiple first layers and the second card body portion comprises multiple second layers, and
wherein the series of pleats are connected between a layer of the multiple first layers and a layer of the multiple second layers.

15. The transaction card of claim 14, wherein the series of pleats is integral with the layer of the multiple first layers and the layer of the multiple second layers.

16. A transaction card, comprising:
a first card body portion;
a second card body portion;
at least one of an integrated circuit (IC) chip or a magnetic stripe accessible from at least one of the first card body portion or the second card body portion; and
a third card body portion configured to contract into a contracted configuration, and to expand into an expanded configuration.

17. The transaction card of claim 16, wherein an area of the first card body portion is equivalent to an area of the second card body portion.

18. The transaction card of claim 16, wherein an area of the first card body portion is greater than an area of the second card body portion.

19. The transaction card of claim 16 wherein a height of the first card body portion is greater than a length of the first card body portion, and
wherein the magnetic stripe extends along the height of the first card body portion.

20. The transaction card of claim 16, wherein a height of the transaction card is greater than a length of the transaction card, and
wherein a contraction of the contracted configuration of the third card body portion and an expansion of the expanded configuration of the third card body portion are along the length of the transaction card.

* * * * *